US009888008B2

(12) United States Patent
Ootaki et al.

(10) Patent No.: US 9,888,008 B2
(45) Date of Patent: Feb. 6, 2018

(54) REMOTE MONITORING SYSTEM AND REMOTE MONITORING APPARATUS

(71) Applicant: KABUSHIKI KAISHA TOSHIBA, Minato-ku (JP)

(72) Inventors: Yuuki Ootaki, Fuchu (JP); Kazuya Shiosaki, Kunitachi (JP); Jin Murata, Kawasaki (JP); Yoko Tanno, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 135 days.

(21) Appl. No.: 14/886,286

(22) Filed: Oct. 19, 2015

(65) Prior Publication Data

US 2016/0119356 A1 Apr. 28, 2016

(30) Foreign Application Priority Data

Oct. 24, 2014 (JP) .................................. 2014-217705

(51) Int. Cl.
*G06F 21/30* (2013.01)
*H04L 29/06* (2006.01)
(Continued)

(52) U.S. Cl.
CPC .......... *H04L 63/101* (2013.01); *G06F 21/305* (2013.01); *G08C 17/02* (2013.01);
(Continued)

(58) Field of Classification Search
CPC ............................. G06F 21/305; H04L 63/101
See application file for complete search history.

(56) References Cited

U.S. PATENT DOCUMENTS 5,764,159 A * 6/1998 Neftel ................... A61M 5/172
340/3.43
6,715,098 B2 * 3/2004 Chen ................... G06F 11/2028
714/3
(Continued)

FOREIGN PATENT DOCUMENTS

EP      2 779 086 A1    9/2014
JP      2011-21977 A    2/2011
(Continued)

OTHER PUBLICATIONS

Office Action dated Aug. 22, 2016 in Taiwanese Patent Application No. 104134368 (with English translation).

*Primary Examiner* — Jason C Chiang
(74) *Attorney, Agent, or Firm* — Oblon, McClelland, Maier & Neustadt, L.L.P.

(57) ABSTRACT

In one embodiment, a remote monitoring system includes a monitoring apparatus displaying a screen for monitoring a power plant, a remote monitoring apparatus displaying the screen transferred from the monitoring apparatus, and a management server managing information regarding the remote monitoring apparatus. The management server includes an activation management module to acquire apparatus identification information for identifying the remote monitoring apparatus, and to return activation permission to the remote monitoring apparatus if the apparatus identification information matches apparatus identification information registered previously. The remote monitoring apparatus includes a secret information storing region to store the apparatus identification information, and to limit software accessible to the secret information storing region to BIOS software of the remote monitoring apparatus, and an activation module to acquire the activation permission from the activation management module by providing the apparatus
(Continued)

identification information in the secret information storing region to the activation management module.

10 Claims, 13 Drawing Sheets

(51) Int. Cl.
    *G08C 17/02*     (2006.01)
    *H04Q 9/00*     (2006.01)

(52) U.S. Cl.
    CPC ............... *H04L 63/08* (2013.01); *H04Q 9/00* (2013.01); *G08C 2201/60* (2013.01); *H04Q 2209/40* (2013.01)

(56) References Cited

U.S. PATENT DOCUMENTS

| | | | | |
|---|---|---|---|---|
| 7,343,260 | B1* | 3/2008 | Kahn | G06F 19/322 702/122 |
| 9,141,150 | B1* | 9/2015 | Trundle | G06F 1/1694 |
| 9,560,026 | B1* | 1/2017 | Worsley | H04L 63/08 |
| 2003/0018749 | A1* | 1/2003 | Sato | G06Q 20/382 709/219 |
| 2003/0226015 | A1* | 12/2003 | Neufeld | G06F 21/305 713/166 |
| 2005/0159826 | A1* | 7/2005 | Tanaka | H02J 13/001 700/83 |
| 2006/0161960 | A1* | 7/2006 | Benoit | G08B 13/19656 725/105 |
| 2006/0242679 | A1* | 10/2006 | Hutchison, III | H04N 7/17318 725/105 |
| 2007/0270980 | A1* | 11/2007 | Lipner | G05B 19/41875 700/19 |
| 2011/0055891 | A1* | 3/2011 | Rice | G06F 21/88 726/2 |
| 2011/0167477 | A1* | 7/2011 | Piccirillo | G06F 21/31 726/4 |
| 2014/0278241 | A1* | 9/2014 | Jiang | G06Q 50/06 702/182 |
| 2015/0097961 | A1* | 4/2015 | Ure | G08B 5/223 348/159 |
| 2015/0128244 | A1* | 5/2015 | Atamna | H04L 63/029 726/11 |

FOREIGN PATENT DOCUMENTS

| | | |
|---|---|---|
| TW | I318065 B | 12/2009 |
| TW | 201040782 A | 11/2010 |

* cited by examiner

| REMOTE MONITORING APPARATUS | USER | DISPLAYING | START | ORDER | TRIGGER |
|---|---|---|---|---|---|
| REMOTE MONITORING APPARATUS 2a | A | MONITORING APPARATUS 3d | 10:00 | MONITORING APPARATUS 3a | PUSH |
| REMOTE MONITORING APPARATUS 2b | B | MONITORING APPARATUS 3e | 09:30 | MONITORING APPARATUS 3b | PUSH |
| SHARED REMOTE MONITORING APPARATUS 9a | X | — | — | MONITORING APPARATUS 3a | PUSH |
| SHARED REMOTE MONITORING APPARATUS 9b | X | — | — | MONITORING APPARATUS 3b | PUSH |
| SHARED REMOTE MONITORING APPARATUS 9c | X | — | — | MONITORING APPARATUS 3c | PUSH |

| REMOTE MONITORING APPARATUS | USER | DISPLAYING | START | ORDER | TRIGGER |
|---|---|---|---|---|---|
| REMOTE MONITORING APPARATUS 2a | A | MONITORING APPARATUS 3c | 10:00 | MONITORING APPARATUS 3a | TIME 10:30 |
| REMOTE MONITORING APPARATUS 2b | B | MONITORING APPARATUS 3b | 09:30 | OFF | TIME 10:30 |
| SHARED REMOTE MONITORING APPARATUS 9a | — | — | — | MONITORING APPARATUS 3b | IMMEDIATELY |
| SHARED REMOTE MONITORING APPARATUS 9b | — | — | — | — | — |
| SHARED REMOTE MONITORING APPARATUS 9c | — | — | — | — | — |

REMOTE MONITORING SYSTEM AND REMOTE MONITORING APPARATUS

CROSS REFERENCE TO RELATED APPLICATION

This application is based upon and claims the benefit of priority from the prior Japanese Patent Application No. 2014-217705, filed on Oct. 24, 2014, the entire contents of which are incorporated herein by reference.

FIELD

Embodiments described herein relate to a remote monitoring system and a remote monitoring apparatus.

BACKGROUND

The operation state of an electric power plant can be monitored by a personal computer (PC) installed in a central operation room. Moreover, the operation of the electric power plant can be operated by providing instructions from the PC in the central operation room to equipment in the electric power plant. However, there have been demands for not fixing the apparatus which monitors and operates the electric power plant to the PC in the central operation room. For example, it is desired to display the operation state of the electric power plant by a PC at the desk of an operator, and to perceive the operation state of the electric power plant while a screen of an operation terminal is checked in a field of the electric power plant.

BRIEF DESCRIPTION OF THE DRAWINGS

FIG. 12 is a drawing showing an example of a display management database in the remote monitoring system of the ninth embodiment; and FIG. 13 is a drawing showing an example of a display management database in a remote monitoring system of a tenth embodiment.

DETAILED DESCRIPTION

Figure 1:
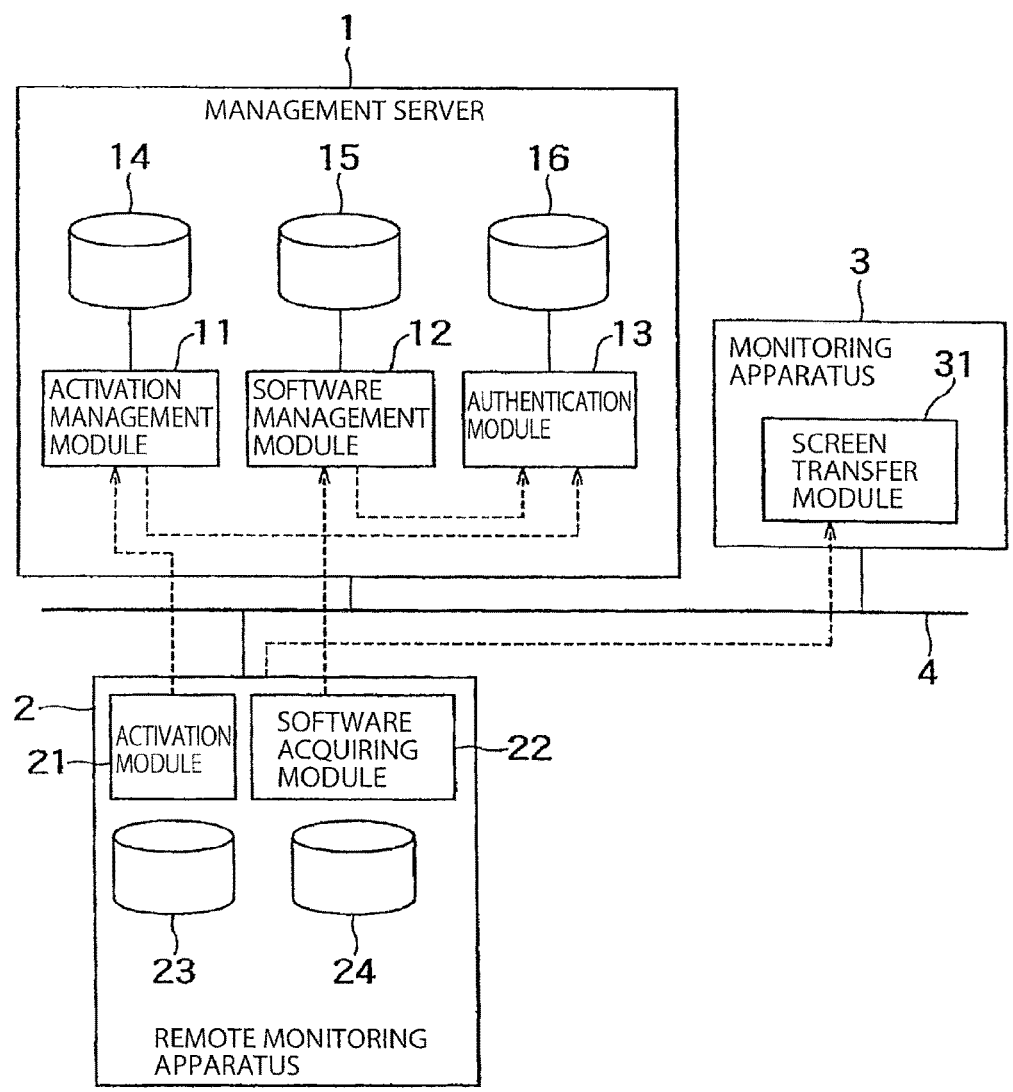
FIG. 1 is a schematic view showing a configuration of a remote monitoring system of a first embodiment.

Embodiments will now be explained with reference to the accompanying drawings.

According to current network techniques, it is easy to cause the PC in the central operation room to join a network outside the central operation room, and to cause the operation terminal outside the central operation room to display the same user interface as that of the PC in the central operation room.

For example, a local area network (LAN) of the central operation room is extended to an office or a field of the electric power plant, and hubs for wired connections or access points for wireless connections are installed at these locations. Furthermore, a portable terminal such as a notebook PC or a tablet is employed as the operation terminal. In this case, if the operation terminal is connected to the LAN, the electric power plant can be monitored or operated by the operation terminal.

In this case, an outsider of the electric power plant may, however, fraudulently connect an operation terminal to the LAN and operate the electric power plant. Furthermore, an outsider may download data regarding electric power generation by this operation terminal and take it away. In addition, when an operator of the electric power plant is using a legitimate operation terminal, an outsider may bring this operation terminal to outside.

Therefore, it is conceivable to employ a thin client terminal as the operation terminal. However, if the thin client terminal is stolen, bring-out of the information stored in this terminal when it is stolen cannot be prevented. If an outsider fraudulently acquires a thin client program and the operator gets away from his/her desk in a state in which the operator has been logged in the thin client terminal at his/her desk, it is impossible to prevent the outsider from fraudulently accessing this terminal.

In one embodiment, a remote monitoring system includes a monitoring apparatus configured to display a monitoring screen for monitoring an electric power plant, a remote monitoring apparatus configured to display the monitoring screen transferred from the monitoring apparatus, and a management server configured to manage information regarding the remote monitoring apparatus. Furthermore, the management server includes an activation management module configured to acquire apparatus identification information for identifying the remote monitoring apparatus, and to return activation permission to the remote monitoring apparatus if the apparatus identification information matches apparatus identification information that is registered in advance, and a software management module configured to acquire user identification information for identifying a user of the remote monitoring apparatus, and to provide connection software to the remote monitoring apparatus if the user identification information matches user identification information that is registered in advance. Furthermore, the remote monitoring apparatus includes a secret information storing region configured to store the apparatus identification information, and to limit software accessible to the secret information storing region to basic input/output system (BIOS) software of the remote monitoring apparatus, an activation module configured to acquire the activation permission from the activation management module by providing the apparatus identification information in the secret information storing region to the activation management module, and to continue activation of the remote monitoring apparatus depending on the activation permission, and a software acquiring module configured to acquire the connection software from the software management module by providing the user identification information to the software management module. Furthermore, the monitoring apparatus includes a screen transfer module configured to transfer the monitoring screen to the remote monitoring apparatus if the remote monitoring apparatus accesses the monitoring apparatus by the connection software.

(First Embodiment)

FIG. 1 is a schematic view showing a configuration of a remote monitoring system of a first embodiment.

The remote monitoring system of FIG. 1 includes a management server 1, a remote monitoring apparatus 2, a monitoring apparatus 3 and a network 4.

The monitoring apparatus 3 displays a monitoring screen for monitoring of an electric power plant. An example of the monitoring apparatus 3 is a PC. The monitoring apparatus 3 is installed, for example, in a central operation room of the electric power plant. A user of the monitoring apparatus 3 of the present embodiment can monitor and operate the electric power plant by the monitoring screen displayed on a display of the monitoring apparatus 3. The monitoring screen displays the operation state of the electric power plant, an operation region for operating the electric power plant, etc.

The remote monitoring apparatus 2 displays a monitoring screen transferred from the monitoring apparatus 3. An example of the remote monitoring apparatus 2 is a PC or a portable operation terminal. The remote monitoring apparatus 2 is used, for example, outside the central operation room of the electric power plant. A user of the remote monitoring apparatus 2 of the present embodiment can monitor and operate the electric power plant by the monitoring screen displayed by a display of the remote monitoring apparatus 2. Specifically, the user of the remote monitoring apparatus 2 can remotely monitor and operate the electric power plant via the monitoring apparatus 3.

The management server 1 manages information regarding the remote monitoring apparatus 2. An example of the management server 1 is a PC or a server apparatus. The management server 1, the remote monitoring apparatus 2, and the monitoring apparatus 3 are mutually connected by the network 4.

[Management Server 1]

The management server 1 includes an activation management module 11, a software management module 12, an authentication module 13, an activation management database 14, a connection software storing module 15 and an authentication database 16.

The authentication database 16 is retaining apparatus identification information for identifying the remote monitoring apparatus 2 and user identification information for identifying the user(s) of the remote monitoring apparatus 2. The apparatus identification information is the information with which the apparatus(es) connected to the network 4 can be uniquely identified. The apparatus identification information of the present embodiment is, for example, a client certificate including the encrypted identification number of the remote monitoring apparatus 2. The user identification information is the information with which the user(s) who uses the network 4 can be uniquely identified. The user identification information of the present embodiment is, for example, a user name and a password of the remote monitoring apparatus 2.

The authentication module 13 checks whether or not the apparatus identification information received from the remote monitoring apparatus 2 matches the apparatus identification information which has been registered in the authentication database 16 in advance and determines whether the apparatus identification information received from the remote monitoring apparatus 2 is valid or not. The authentication module 13 checks whether or not the user identification information received from the remote monitoring apparatus 2 matches the user identification information which has been registered in the authentication database 16 in advance and determines whether the user identification information received from the remote monitoring apparatus 2 is valid or not.

The activation management module 11 receives the apparatus identification information from the remote monitoring apparatus 2 and checks, by the authentication module 13, whether or not the received apparatus identification information matches the apparatus identification information registered in the authentication database 16. Then, if the received apparatus identification information matches the registered apparatus identification information, the activation management module 11 returns activation permission to the remote monitoring apparatus 2. On the other hand, if the received apparatus identification information does not match the registered apparatus identification information, the activation management module 11 returns activation non-permission to the remote monitoring apparatus 2. The information of the activation permission and the activation non-permission is associated with the apparatus identification information and stored in the activation management database 14.

The activation management database 14 can retain the apparatus identification information of the remote monitoring apparatus 2 and activation information of the remote monitoring apparatus 2 so that the information is mutually associated. An example of the activation information is information of activation permission and activation non-permission.

The software management module 12 receives user identification information from the remote monitoring apparatus 2 and checks, by the authentication module 13, whether or not the received user identification information matches the user identification information registered in the authentication database 16. Then, if the received user identification information matches the registered user identification information, the software management module 12 provides connection software to the remote monitoring apparatus 2. On the other hand, if the received user identification information does not match the registered user identification information, the software management module 12 does not provide the connection software to the remote monitoring apparatus 2.

The connection software storing module 15 is retaining the connection software for the remote monitoring apparatus 2 to access the monitoring apparatus 3. If the received user identification information matches the registered user identification information, the software management module 12 provides the connection software stored in the connection software storing module 15 to the remote monitoring apparatus 2.

[Remote Monitoring Apparatus 2]

The remote monitoring apparatus 2 includes an activation module 21, a software acquiring module 22, an apparatus identification information storing module 23 and a server information storing module 24.

The apparatus identification information storing module 23 is retaining the apparatus identification information of the remote monitoring apparatus 2. The server information storing module 24 is retaining server information of the management server 1. An example of the server information is address information or the like of the management server 1. The remote monitoring apparatus 2 can access the management server 1 by using the server information.

The activation module 21 provides the apparatus identification information in the apparatus information storing module 23 to the activation management module 11, thereby acquiring the activation permission or the activation non-permission from the activation management module 11. If the activation permission is received, the activation module 21 continues activation of the remote monitoring apparatus 2. On the other hand, if the activation non-permission is received, the activation module 21 stops a power source of the remote monitoring apparatus 2.

The software acquiring module 22 provides the user identification information of the user of the remote monitoring apparatus 2 to the software management module 12, thereby acquiring the connection software from the software management module 12. The user identification information of the present embodiment is input by the user from a user interface of the remote monitoring apparatus 2.

[Monitoring Apparatus 3]

The monitoring apparatus 3 includes a screen transfer module 31.

If the remote monitoring apparatus 2 accesses the monitoring apparatus 3 by the connection software, the screen transfer module 31 transfers the monitoring screen to the remote monitoring apparatus 2. As a result, the user of the remote monitoring apparatus 2 can remotely monitor and operate the electric power plant via the monitoring apparatus 3.

Figure 2:
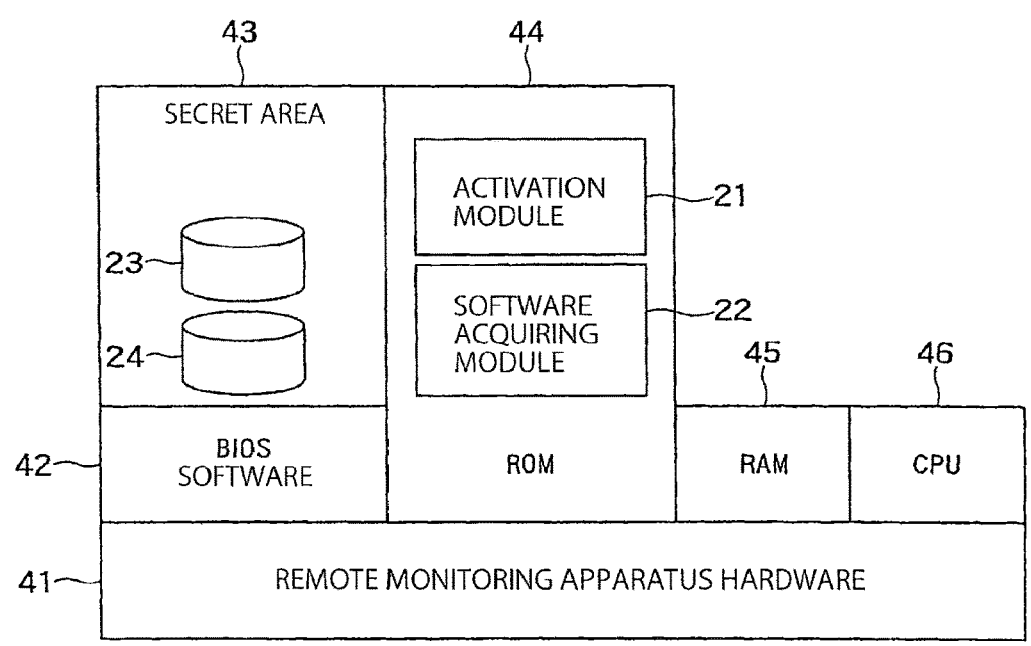
FIG. 2 is a schematic view showing a configuration of a remote monitoring apparatus of the first embodiment.

FIG. 2 is a schematic view showing a configuration of the remote monitoring apparatus 2 of the first embodiment.

The remote monitoring apparatus 2 of the present embodiment includes remote monitoring apparatus hardware 41 including various hardware of the remote monitoring apparatus 2, basic input/output system (BIOS) software 42, and a secret area 43 as an example of a secret information storing region.

The remote monitoring apparatus 2 of the present embodiment further includes a read only memory (ROM) 44 as a non-volatile memory, a random access memory (RAM) 45 as a volatile memory, and a central processing unit (CPU) 46. However, the remote monitoring apparatus 2 of the present embodiment does not include an auxiliary storing device such as a hard disc drive (HDD).

The BIOS software 42 performs lowest-level input/output to/from the remote monitoring apparatus hardware 41 among the software of the remote monitoring apparatus 2. In the present embodiment, the software that can access the secret area 43 is limited to the BIOS software 42. Therefore, the secret area 43 of the present embodiment can be accessed only by the BIOS software 42, and the other software of the remote monitoring apparatus 2 cannot access the secret area.

The apparatus identification information storing module 23 and the server information storing module 24 of the present embodiment are provided in the secret area 43. Therefore, the apparatus identification information of the remote monitoring apparatus 2 and the server information of the management server 1 is stored in the secret area 43 and can be accessed only by the BIOS software 42. The activation module 21 and the software acquiring module 22 of the present embodiment are realized by the software stored in the ROM 44.

Figure 3:
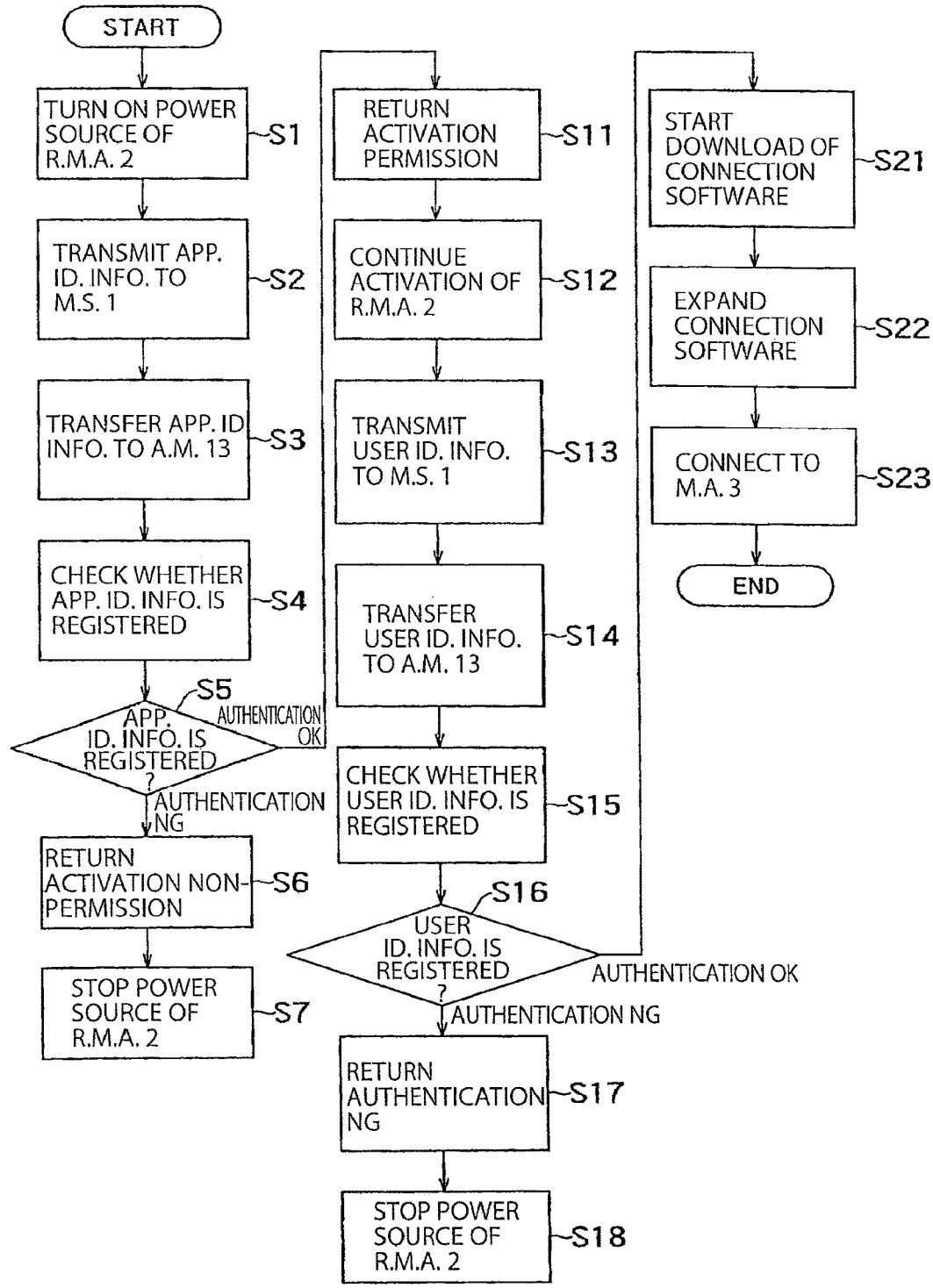
FIG. 3 is a flow chart showing operation of the remote monitoring system of the first embodiment.

FIG. 3 is a flow chart showing operation of the remote monitoring system of the first embodiment. The flow chart of FIG. 3 shows a procedure until the remote monitoring apparatus 2 is connected to the monitoring apparatus 3.

First, when the user of the remote monitoring apparatus 2 turns on the power source of the remote monitoring apparatus 2 (step S1), the activation module 21 transmits the apparatus identification information in the secret area 43 to the management server 1 and requests activation permission of the remote monitoring apparatus 2 (step S2). The apparatus identification information is provided to the activation management module 11 of the management server 1. The process of reading the apparatus identification information from the secret area 43 is performed by the BIOS software 42.

Then, the activation management module 11 transfers the apparatus identification information to the authentication module 13 (step S3). Then, the authentication module 13 checks whether or not the apparatus identification information is registered in the authentication database 16 and returns a check result to the activation management module 11 (step S4).

In a case of authentication NG, in other words, if the apparatus identification information is not registered (step S5), the activation management module 11 returns activation non-permission to the remote monitoring apparatus 2 (step S6). In this case, the activation module 21 stops the power source of the remote monitoring apparatus 2 (step S7).

On the other hand, in a case of authentication OK, in other words, if the apparatus identification information is registered (step S5), the activation management module 11 returns activation permission to the remote monitoring apparatus 2 (step S11). In this case, the activation module 21 does not stop the power source of the remote monitoring apparatus 2, but continues activation of the remote monitoring apparatus 2 (step S12).

In this manner, the activation module 21 is set so as to continue activation of the remote monitoring apparatus 2 only when the activation permission is returned from the management server 1. In the present embodiment, this setting is stored in the secret area 43 so that this setting cannot be changed by the user of the remote monitoring apparatus 2.

If activation of the remote monitoring apparatus 2 is continued, the software acquiring module 22 requests input of user identification information from the user interface of the remote monitoring apparatus 2. The user identification information may be any information as long as the user can be identified. An example of the user identification information is a combination of a user name and a password or biometric authentication information such as a fingerprint. When the user identification information is input to the remote monitoring apparatus 2, the software acquiring module 22 transmits the user identification information to the management server 1 for authentication to acquire the connection software (step S13). The user identification information is provided to the software management module 12 of the management server 1.

Then, the software management module 12 transfers the user identification information to the authentication module 13 (step S14). Then, the authentication module 13 checks whether or not the user identification information is registered in the authentication database 16 and returns a check result to the software management module 12 (step S15).

In a case of authentication NG, in other words, if the user identification information is not registered (step S16), the software management module 12 returns authentication NG to the remote monitoring apparatus 2 (step S17). In this case, the activation module 21 stops the power source of the remote monitoring apparatus 2 (step S18).

On the other hand, in a case of authentication OK, in other words, if the user identification information is registered (step S16), the software management module 12 permits downloading of the connection software from the management server 1 to the remote monitoring apparatus 2. As a result, downloading of the connection software is started (step S21).

In this manner, the software acquiring module 22 can acquire (download) the connection software, which is required for connecting to the monitoring apparatus 3, only when the user identification information is registered.

The downloading of the connection software is performed onto a RAM 45 of the remote monitoring apparatus 2, and the connection software is expanded and used on the RAM 45 (step S22). Then, the remote monitoring apparatus 2 is connected to the monitoring apparatus 3 by the connection software (step S23).

In this process, the connection software or the monitoring apparatus 3 may request authentication by the apparatus identification information or the user identification information again. The connection software may have a shared key for authentication.

Then, the connection software transmits screen information of the monitoring apparatus 3 to the remote monitoring apparatus 2 and transmits the input information of a mouse or a keyboard of the remote monitoring apparatus 2 to the monitoring apparatus 3. As a result, the remote monitoring apparatus 2 can work as if it is present at the position of the monitoring apparatus 3.

All of the communication between the management server 1, the remote monitoring apparatus 2, and the monitoring apparatus 3 of the present embodiment is performed on encrypted communication paths of, for example, secure socket layer (SSL).

(Effects of First Embodiment)

As described above, in the present embodiment, on the condition that the apparatus identification information of the remote monitoring apparatus 2 is registered in the management server 1, activation of the remote monitoring apparatus 2 can be continued. Therefore, according to the present embodiment, a fraudulent operation terminal(s) for which apparatus identification information is not registered can be prevented from accessing the monitoring apparatus 3.

In the present embodiment, the apparatus identification information of the remote monitoring apparatus 2 is stored in the secret area 43 which can be accessed only by the BIOS software 42. Therefore, if there is a person who has fraudulently obtained the remote monitoring apparatus 2, this person normally cannot read or rewrite the apparatus identification information of the remote monitoring apparatus 2. Therefore, according to the present embodiment, applying operation identification information of the valid remote monitoring apparatus 2 to a fraudulent operation terminal and accessing the monitoring apparatus 3 can be prevented.

The apparatus identification information of the present embodiment, for example, is stored in the secret area 43 before a manufacturer ships the remote monitoring apparatus 2 and is set so that the user of the remote monitoring apparatus 2 cannot read or rewrite the apparatus identification information.

On the other hand, the server information of the present embodiment may be stored in the secret area 43 by the manufacturer of the remote monitoring apparatus 2 before shipment or may be set so that the server information can be read and rewritten by the user of the remote monitoring apparatus 2 with the BIOS software 42. In the latter case, the user can change the server information when the management server 1 is changed.

In the present embodiment, on the condition that the apparatus identification information of the remote monitoring apparatus 2 and the user identification information of the user of the remote monitoring apparatus 2 is registered in the management server 1, the connection software can be downloaded from the management server 1 to the remote monitoring apparatus 2. Therefore, according to the present embodiment, since fraudulent operation terminals and fraudulent users cannot obtain the connection software, the fraudulent operation terminals and fraudulent users can be prevented from accessing the monitoring apparatus 3.

The remote monitoring apparatus 2 of the present embodiment does not include an auxiliary storage apparatus such as HDD, and the connection software and processing data is stored on the RAM 45. Therefore, when the power source of the remote monitoring apparatus 2 is stopped, the connection software and the processing data in the remote monitoring apparatus 2 disappear. Therefore, even if there is a person who has fraudulently obtained the power-source-turned-off remote monitoring apparatus 2, the connection software and the processing data is not saved in the remote monitoring apparatus 2. Therefore, according to the present embodiment, this person can be prevented from obtaining the connection software and the processing data.

In the above described manner, according to the present embodiment, security regarding remote monitoring of the electric power plant can be improved.

Hereinafter, second to tenth embodiments will be explained. Regarding the second to tenth embodiments, the points different from the first embodiment will be mainly explained. Regarding the components in the management server 1, the remote monitoring apparatus 2 and the monitoring apparatus 3, a part of the components shown in FIG. 1 is appropriately omitted from illustration in FIGS. 4 to 11 in order to simplify the drawings. The configuration of FIG. 2 is also applied to the second to tenth embodiments.

(Second Embodiment)

Figure 4:
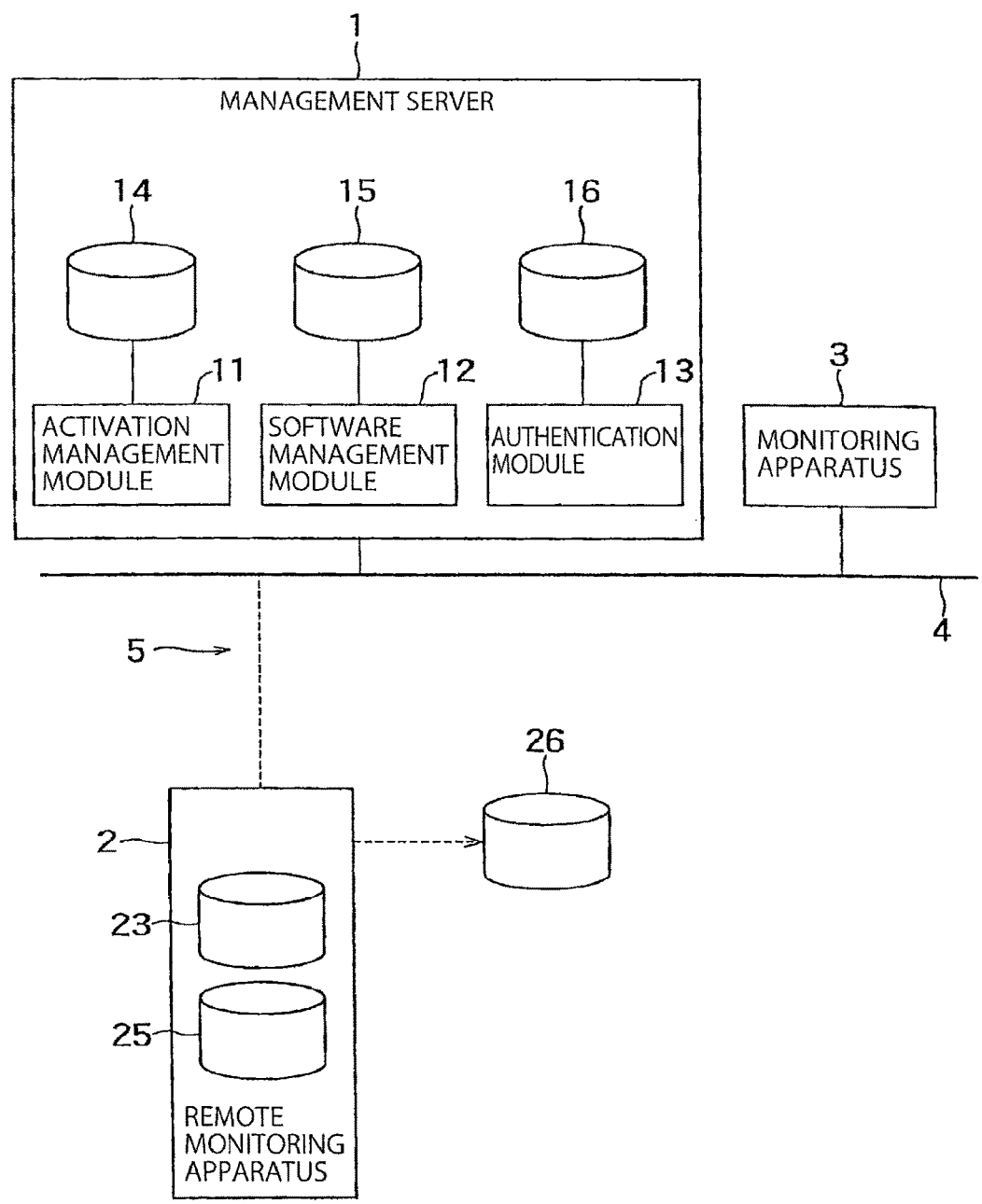
FIG. 4 is a schematic view showing a configuration of a remote monitoring system of a second embodiment.

FIG. 4 is a schematic view showing a configuration of a remote monitoring system of a second embodiment.

The remote monitoring apparatus 2 of the present embodiment can be connected to the network 4 by using a wireless network 5. An example of the wireless network 5 is a wireless LAN.

The remote monitoring apparatus 2 of the present embodiment includes a wireless information storing module 25 in the secret area 43. The wireless information storing module 25 is retaining wireless information which is used for connection to the wireless network 5. An example of the wireless information is user identification information (for example, a user name and a password) for the user of the remote monitoring apparatus 2.

After the activation permission is obtained from the management server 1, the remote monitoring apparatus 2 periodically performs heartbeat communication with the activation management module 11 of the management server 1 via the wireless network 5. As a result, the remote monitoring apparatus 2 can check whether or not the remote monitoring apparatus 2 is connected to the wireless network 5. If the heartbeat communication is lost, the remote monitoring apparatus 2 forcibly stops the power source of the remote monitoring apparatus 2.

The remote monitoring system of the present embodiment includes a user recognizing apparatus 26. The user recognizing apparatus 26 of the present embodiment can be checked to be present without contact like an IC (Integrated Circuit) tag, has a narrower wireless communication range compared with a wireless LAN, and is an apparatus which can be worn by the user of the remote monitoring apparatus 2.

After the activation permission is obtained from the management server 1, the remote monitoring apparatus 2 periodically performs heartbeat communication by wireless communication with the user recognizing apparatus 26. As a result, the remote monitoring apparatus 2 can check whether or not the user recognizing apparatus 26 is present in the wireless communication range. This corresponds to checking whether the user of the remote monitoring apparatus 2 is near the remote monitoring apparatus 2. If the presence of the user recognizing apparatus 26 cannot be checked by the heartbeat communication, the remote monitoring apparatus 2 forcibly turns off the power source of the remote monitoring apparatus 2.

In this manner, the remote monitoring apparatus 2 of the present embodiment performs heartbeat communication with the management server 1 and the user recognizing apparatus 26 by wireless communication and, based on the state of the heartbeat communication, stops the power source of the remote monitoring apparatus 2. The management server 1 and the user recognizing apparatus 26 are examples of the apparatuses which can communicate with the remote monitoring apparatus 2.

(Effects of Second Embodiment)

In the present embodiment, the wireless network 5 is employed in the connection between the remote monitoring apparatus 2 and the network 4. Therefore, according to the present embodiment, the remote monitoring apparatus 2 can be used at various locations in the electric power plant, and usability of the user can be improved.

In the present embodiment, in a case in which the remote monitoring apparatus 2 in use is stolen by an outsider of the electric power plant, if the remote monitoring apparatus 2 is moved to outside the communication area of the wireless network 5, the power source of the remote monitoring apparatus 2 is stopped, and it cannot be used. Therefore, according to the present embodiment, fraudulent usage due to steeling of the remote monitoring apparatus 2 can be prevented.

In the present embodiment, if the user wearing the user recognizing apparatus 26 gets away from the remote monitoring apparatus 2 in use, the power source of the remote monitoring apparatus 2 is stopped, and it cannot be used. Therefore, the remote monitoring apparatus 2 used by a valid user cannot be continuously used by a fraudulent user. Therefore, according to the present embodiment, usage of the remote monitoring apparatus 2 by a fraudulent user can be prevented.

In the above manner, according to the present embodiment, in remote monitoring of the electric power plant, while usability of the user is improved by wireless communication, security for the wireless communication can be ensured.

(Third Embodiment)

Figure 5:
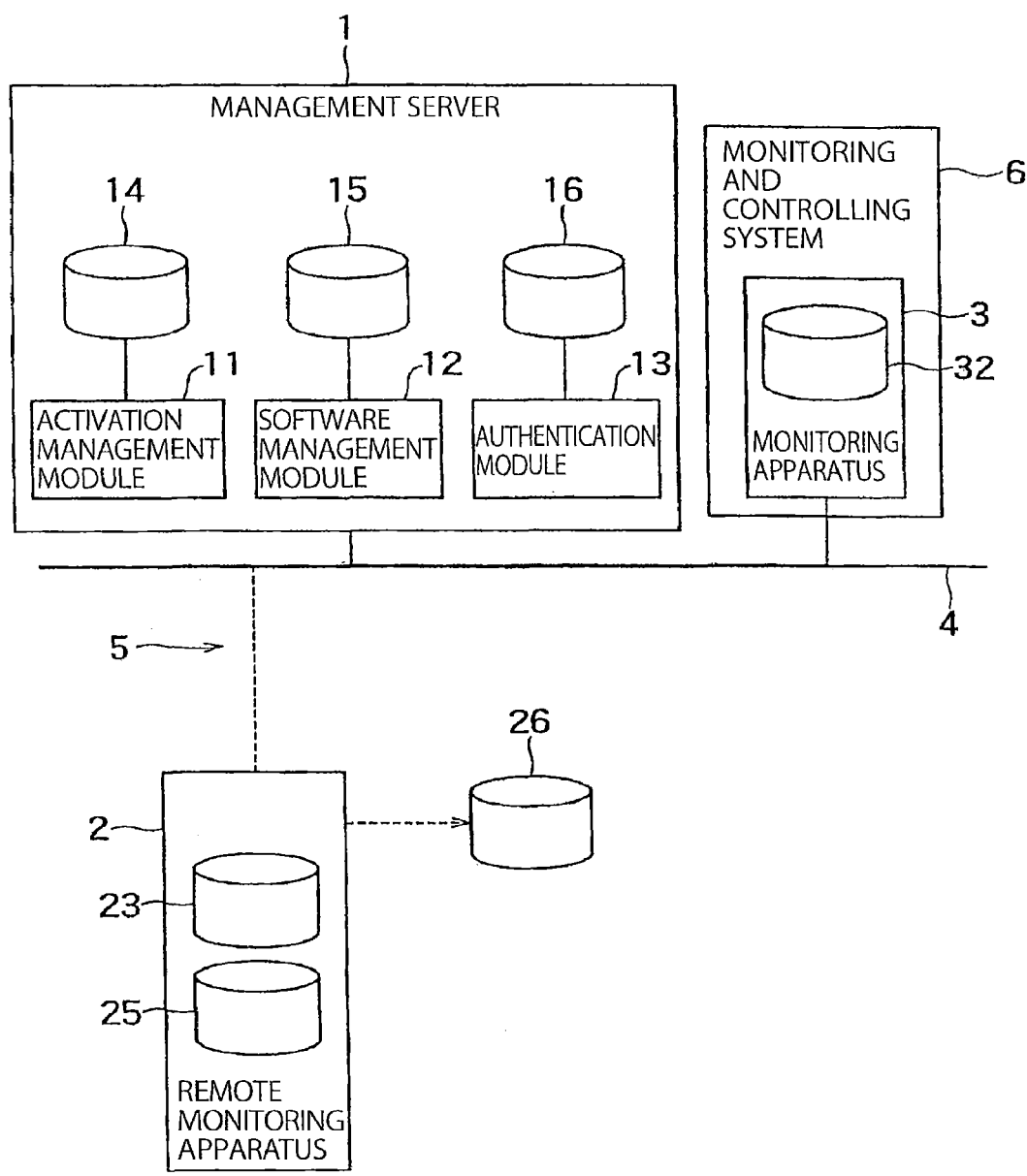
FIG. 5 is a schematic view showing a configuration of a remote monitoring system of a third embodiment.

FIG. 5 is a schematic view showing a configuration of a remote monitoring system of a third embodiment.

The monitoring apparatus 3 of the present embodiment constitutes a monitoring and controlling system 6 of the electric power plant. The monitoring and controlling system 6 is a system which monitors and controls the electric power plant. The monitoring and controlling system 6 of the present embodiment includes one or more controlling apparatuses which control operation of the electric power plant, and one or more monitoring apparatuses which monitor and operate operation of the electric power plant via the controlling apparatuses. The monitoring apparatus 3 of the present embodiment is one of these monitoring apparatuses.

The monitoring apparatus 3 of the present embodiment includes a human machine interface (HMI) software storing module 32, which retains HMI software. The HMI software of the present embodiment is retaining information such as a system diagram of the electric power plant and can collect information regarding the state of the electric power plant by using the monitoring and controlling system 6. The HMI software of the present embodiment can graphically display the state of the electric power plant by using the retained information and/or the collected information.

The remote monitoring apparatus 2 accesses the monitoring apparatus 3 by the connection software. In this process, the remote monitoring apparatus 2 of the present embodiment can acquire various information of the electric power plant by operating the HMI software in the monitoring apparatus 3.

(Effects of Third Embodiment)

The remote monitoring apparatus 2 of the present embodiment can monitor and operate the electric power plant by using the connection software in the remote monitoring apparatus 2 and the HMI software in the monitoring apparatus 3.

Therefore, according to the present embodiment, the risk of fraudulent acquisition of the data regarding electric power generation can be reduced by giving fewer functions to the connection software and giving more functions to the HMI software. The reason therefor is that, if the information such as the system diagram of the electric power plant is retained in the connection software side, the risk of leaking this information due to fraudulent acquisition of the connection software is increased.

If fewer functions are given to the connection software and more functions are given to the HMI software, the function of creating the monitoring screen can be realized only by the HMI software. In this case, the connection software only simply uses the monitoring screen created by the HMI software. Therefore, if the connection between the monitoring apparatus 3 and the remote monitoring apparatus 2 is disconnected and the monitoring apparatus 3 and the remote monitoring apparatus 2 are reconnected, the monitoring apparatus 3 can transfer the monitoring screen that is in the state before disconnection to the remote monitoring apparatus 2. The reason therefor is that the information regarding the monitoring screen is retained in the HMI software side.

Therefore, according to the present embodiment, if the connection between the monitoring apparatus 3 and the remote monitoring apparatus 2 is disconnected and the monitoring apparatus 3 and the remote monitoring apparatus 2 are reconnected, the monitoring screen on the display of the remote monitoring apparatus 2 can be returned to the state before the disconnection.

Such screen control is desired to be applied to, for example, the Second Embodiment. The reason therefor is that disconnection of the connection between the monitoring apparatus 3 and the remote monitoring apparatus 2 tends to occur in a case in which wireless communication is used.

(Fourth Embodiment)

Figure 6:
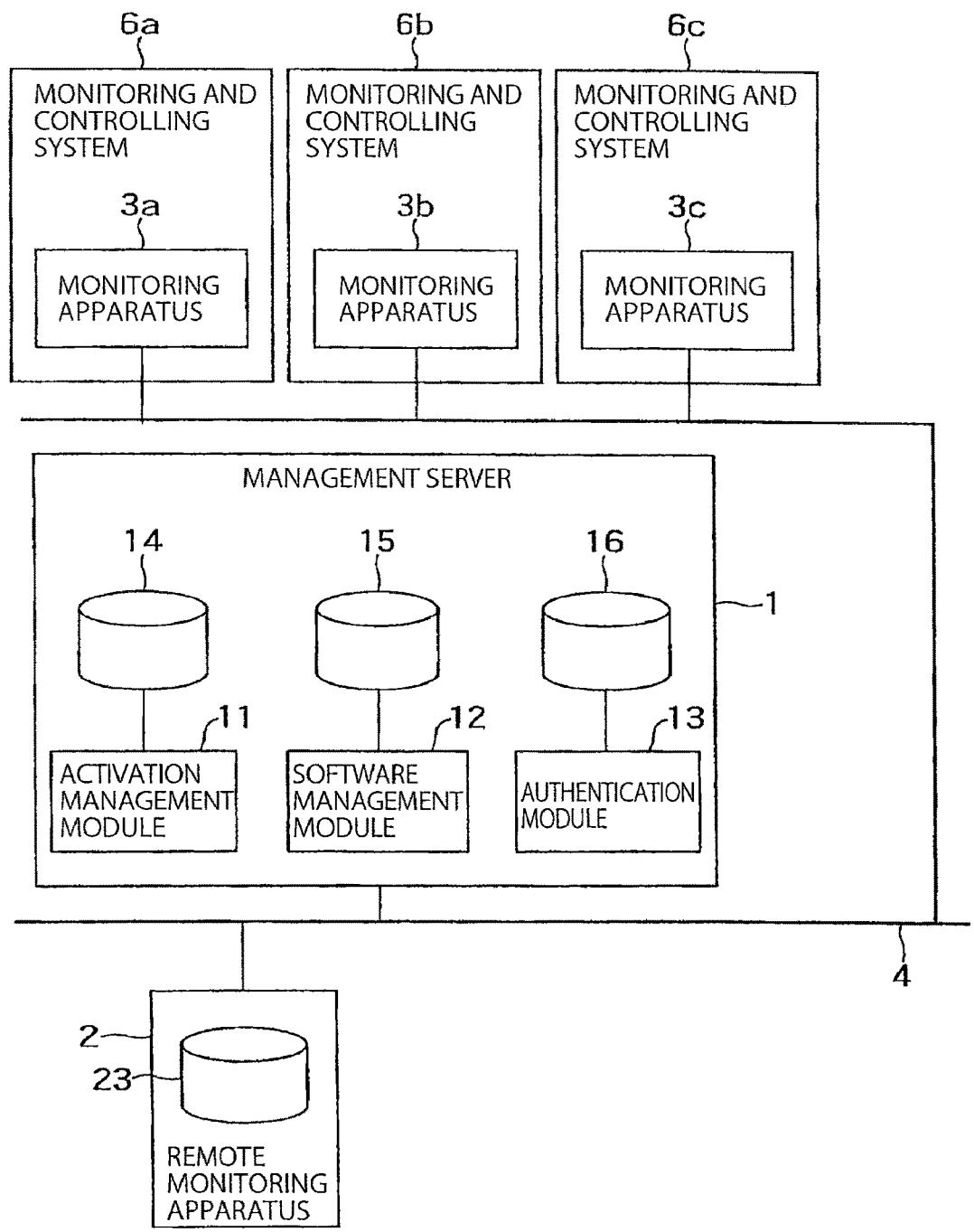
FIG. 6 is a schematic view showing a configuration of a remote monitoring system of a fourth embodiment.

FIG. 6 is a schematic view showing a configuration of a remote monitoring system of a fourth embodiment.

The remote monitoring system of FIG. 6 includes a plurality of monitoring apparatuses 3a to 3c. The monitoring apparatuses 3a to 3c are examples of first to n-th (n is an integer of two or more) monitoring apparatuses. Signs "a" to "c" after the sign "3" are attached for distinguishing the monitoring apparatuses 3 from one another (hereinafter, the same applies). Each of the monitoring apparatuses 3a to 3c has functions similar to those of the monitoring apparatus 3 of FIG. 1 and includes the screen transfer module 31 of FIG. 1. Each of the monitoring apparatuses 3a to 3c may be further provided with the HMI software storing module 32 of FIG. 5.

The monitoring apparatuses 3a to 3c constitute monitoring and controlling systems 6a to 6c, respectively. The monitoring and controlling systems 6a to 6c are examples of first to n-th monitoring and controlling systems. Each of the monitoring and controlling systems 6a to 6c has functions similar to those of the monitoring and controlling system 6 of FIG. 5. The monitoring and controlling systems 6a to 6c may monitor and control the same electric power plant or may monitor and control different electric power plants. Therefore, in the present embodiment, one or more electric power plants are monitored and controlled by the two or more monitoring and controlling systems 6a to 6c.

The remote monitoring apparatus 2 may be directly connected to the network 4 or may be connected to the network 4 via the wireless network 5. The remote monitoring apparatus 2 downloads the connection software from the management server 1, then accesses the monitoring apparatuses 3a to 3c, and retains three connections with the monitoring apparatuses 3a to 3c, respectively. The remote monitoring apparatus 2 displays three monitoring screens, which have been transferred from the monitoring apparatuses 3a to 3c, on one display by switching or juxtaposing.

The remote monitoring apparatus 2 may access the plurality of monitoring apparatuses in the single monitoring and controlling system. For example, the remote monitoring apparatus 2 may access the monitoring apparatus 3a in the monitoring and controlling system 6a and another monitoring apparatus in the monitoring and controlling system 6a.

(Effects of Fourth Embodiment)

In the present embodiment, the plurality of monitoring apparatuses 3a to 3c can be accessed by the single remote monitoring apparatus 2. In the present embodiment, the plurality of monitoring and controlling systems 6a to 6c can be accessed by the single remote monitoring apparatus 2. Therefore, according to the present embodiment, at one location, the user can use the plurality of monitoring apparatuses 3a to 3c and the plurality of monitoring and controlling systems 6a to 6c.

(Fifth Embodiment)

Figure 7:
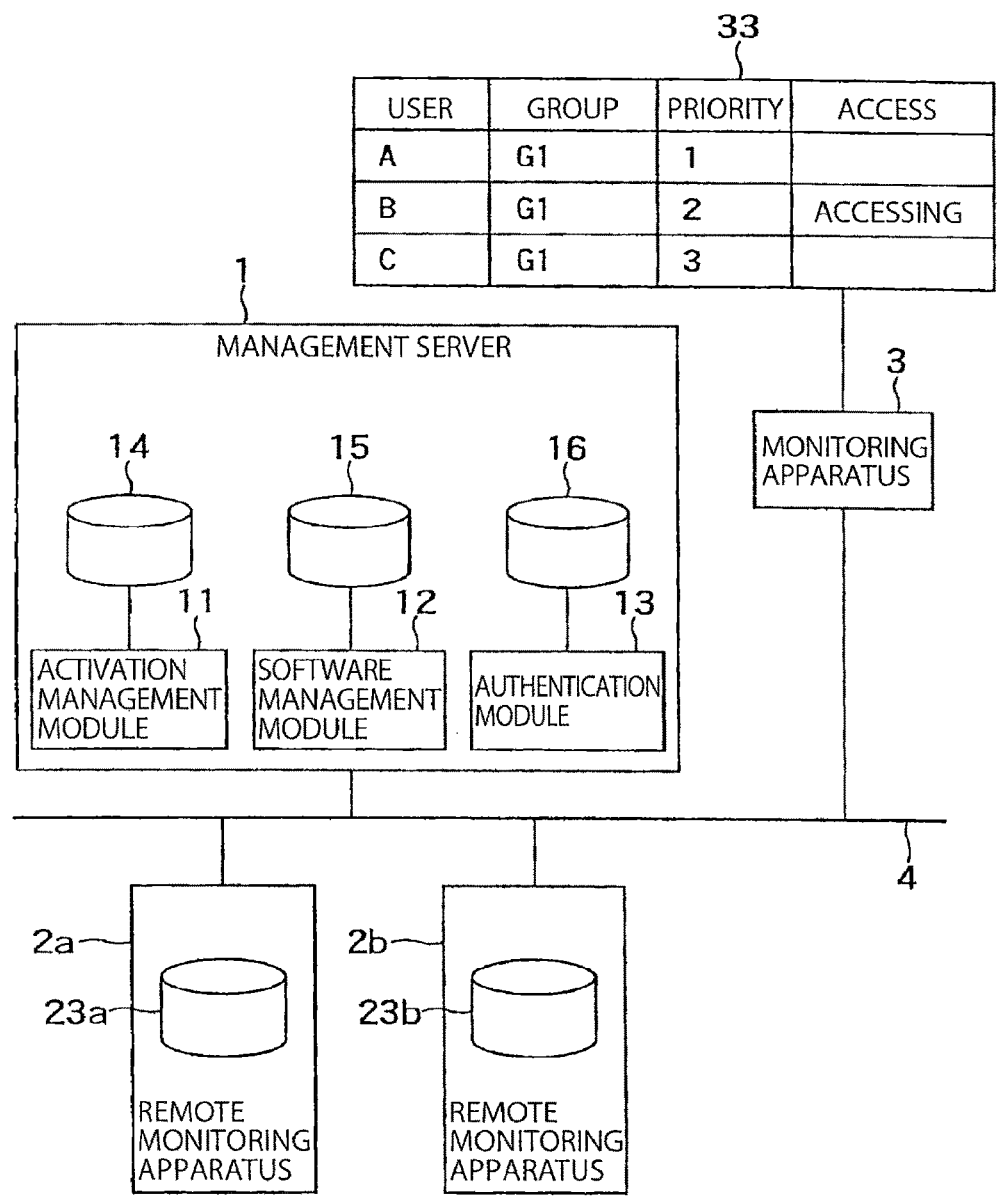
FIG. 7 is a schematic view showing a configuration of a remote monitoring system of a fifth embodiment.

FIG. 7 is a schematic view showing a configuration of a remote monitoring system of a fifth embodiment.

The remote monitoring system of FIG. 7 includes a plurality of remote monitoring apparatuses 2a and 2b. The remote monitoring apparatuses 2a and 2b are examples of first to m-th (m is an integer of two or more) remote monitoring apparatuses. Each of the remote monitoring apparatuses 2a and 2b has functions similar to those of the remote monitoring apparatus 2 of FIG. 1. For example, the remote monitoring apparatuses 2a and 2b are respectively provided with apparatus identification information storing modules 23a and 23b having functions similar to those of the apparatus identification information storing module 23 of FIG. 1.

The monitoring apparatus 3 of the present embodiment includes a user management table 33, which manages priority when users of the remote monitoring apparatuses 2a and 2b access the monitoring apparatus 3. The monitoring apparatus 3 of the present embodiment is set so that the plurality of remote monitoring apparatuses 2a and 2b cannot simultaneously connect the monitoring apparatus 3. If the remote monitoring apparatuses 2a and 2b simultaneously try to connect to the monitoring apparatus 3, the monitoring apparatus 3 permits connection based on the priority of the users of the remote monitoring apparatuses 2a and 2b.

In the present embodiment, the priority of each user can be defined in the user management table 33. FIG. 7 shows the priority "1" of a user A, the priority "2" of a user B, and the priority "3" of a user C. In the present embodiment, the smaller the values of the priority of the users, the higher the priority of the users. Therefore, the priority of the user A is higher than the priority of the users B and C. In the present embodiment, it is conceivable to give high priority to a responsible person of the electric power plant or a person who includes the authority to operate the electric power plant.

The user management table 33 can further manage the information of the user who is accessing the monitoring apparatus 3 at the present point of time. FIG. 7 shows that the user B is accessing the monitoring apparatus 3.

In this case, if the user A accesses the monitoring apparatus 3, the connection of the user B to the remote monitoring apparatus 2 is cancelled, and the connection of the user A to the remote monitoring apparatus 2 is permitted. The reason therefor is that the priority of the user A is higher than the priority of the user B.

On the other hand, if the user C accesses the monitoring apparatus 3, the connection of the user B to the remote monitoring apparatus 2 is maintained, and the connection of the user C to the remote monitoring apparatus 2 is rejected. The reason therefor is that the priority of the user C is lower than the priority of the user B.

The monitoring apparatus 3 may acquire the information of the users of the remote monitoring apparatuses 2a and 2b by any method. For example, when the remote monitoring apparatuses 2a and 2b access the monitoring apparatus 3, the monitoring apparatus 3 may request the remote monitoring apparatuses 2a and 2b to provide user identification information.

(Effects of Fifth Embodiment)

If the remote monitoring system includes the plurality of remote monitoring apparatuses 2a and 2b, it is conceivable to use former-one priority or latter-one priority for the access to the monitoring apparatus 3. The former-one priority is a method in which the connection of the user who has first connected to the monitoring apparatus 3 is prioritized. The latter-one priority is a method in which the connection of the user who later connects to the monitoring apparatus 3 is prioritized.

If the former-one priority is employed, a problem that, while one user is using the monitoring apparatus 3, another user cannot use the monitoring apparatus 3 occurs. If the latter-one priority is employed, a problem that, while the user who has connected first is carrying out an important operation, the connection of the first-connected user is disconnected by the user who later connects thereto occurs.

According to the present embodiment, the single monitoring apparatus 3 can be effectively used by a plurality of users by providing the user management table 33 in the monitoring apparatus 3. The present embodiment can be applied to a remote monitoring system that uses a few monitoring apparatuses 3 by many users and many remote monitoring apparatuses 2.

(Sixth Embodiment)

Figure 8:
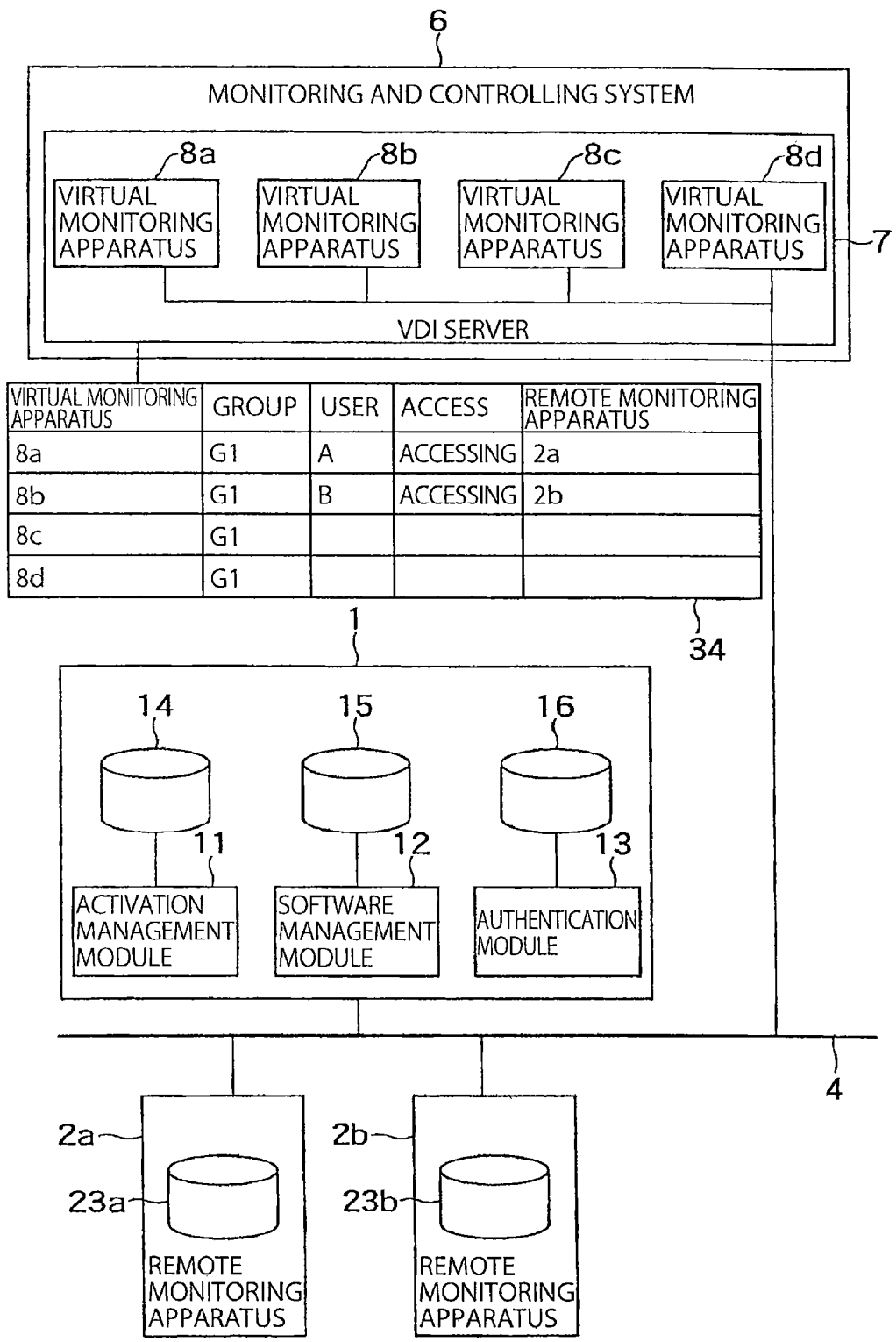
FIG. 8 is a schematic view showing a configuration of a remote monitoring system of a sixth embodiment.

FIG. 8 is a schematic view showing a configuration of a remote monitoring system of a sixth embodiment.

The remote monitoring system of FIG. 5 includes the monitoring apparatus 3 constituting the monitoring and controlling system 6 as an example of the monitoring apparatus. The remote monitoring system of FIG. 6 includes, as examples of the monitoring apparatus, the monitoring apparatuses 3a to 3c respectively constituting the monitoring and controlling systems 6a to 6c.

On the other hand, the remote monitoring system of FIG. 8 includes, an example of the monitoring apparatus, a virtual desktop infrastructure (VDI) server 7 constituting a monitoring and controlling system 6. The VDI server 7 is an example of a monitoring server.

The VDI server 7 includes one or more virtual monitoring apparatuses 8a to 8d. The virtual monitoring apparatuses 8a to 8d are physically realized by the single VDI server 7, but look like a plurality of monitoring apparatuses 3 from the remote monitoring apparatuses 2a and 2b. Each of the virtual monitoring apparatuses 8a to 8d has functions similar to those of the monitoring apparatus 3 of FIG. 1 and includes the screen transfer module 31 of FIG. 1. Each of the virtual monitoring apparatuses 8a to 8d may be further provided with the HMI software storing module 32 of FIG. 5.

The VDI server 7 of the present embodiment includes a VDI management table 34 which manages the virtual monitoring apparatuses 8a to 8d. The VDI management table 34 can manage the information of the user(s) accessing the virtual monitoring apparatuses 8a to 8d at the present point of time. FIG. 8 shows that a user A is accessing the virtual monitoring apparatus 8a by the remote monitoring apparatus 2a and that a user B is accessing the virtual monitoring apparatus 8b by the remote monitoring apparatus 2b. The VDI management table 34 may define priority as well as the user management table 33.

The remote monitoring apparatuses 2a and 2b access the VDI server 7 by the connection software. In this process, the VDI server 7 of the present embodiment checks, by the authentication module 13 of the management server 1, whether or not the remote monitoring apparatuses 2a and 2b are registered and whether or not the users of the remote monitoring apparatuses 2a and 2b are registered. Then, on the condition that the apparatuses and the users are registered, the VDI server 7 connects the remote monitoring apparatuses 2a and 2b to the virtual monitoring apparatuses 8a to 8d.

The virtual monitoring apparatuses 8a to 8d of the present embodiment may have the same functions or may have different functions. In the former case, if the connection of the new remote monitoring apparatus 2 is to be permitted during usage of the virtual monitoring apparatuses 8a, 8b, and 8c, the VDI server 7 may connect this remote monitoring apparatus 2 to the virtual monitoring apparatus 8d. In the latter one, if the new remote monitoring apparatus 2 is to connect to the virtual monitoring apparatus 8a during usage of the virtual monitoring apparatus 8a, the VDI server 7 may determine whether to connect this or not based on priority. In the latter case, the remote monitoring apparatuses 2a and 2b may be able to select the virtual monitoring apparatuses 8a to 8d to be used.

(Effects of Sixth Embodiment)

According to the present embodiment, since the monitoring apparatus 3 is replaced by the virtual monitoring apparatus 8, monitoring functions can be centralized by the VDI server 7. According to the present embodiment, by centralizing the monitoring functions, the cost to build the remote monitoring system can be reduced.

According to the present embodiment, when the user(s) who can access the virtual monitoring apparatuses 8 are defined in advance, formats of the monitoring screens of the users can be set in advance.

Generally, in the electric power plant, the users who run the electric power plant by using the monitoring and controlling system 6 and the users who manage the equipment installed in the electric power plant use different types of monitoring screens. According to the present embodiment, the virtual monitoring apparatus 8 used by each user (or each group to which the user(s) belong) can be set in advance. As a result, when the users access the virtual monitoring apparatuses 8, the monitoring screens can be provided to the users in a short period of time.

(Seventh Embodiment)

Figure 9:
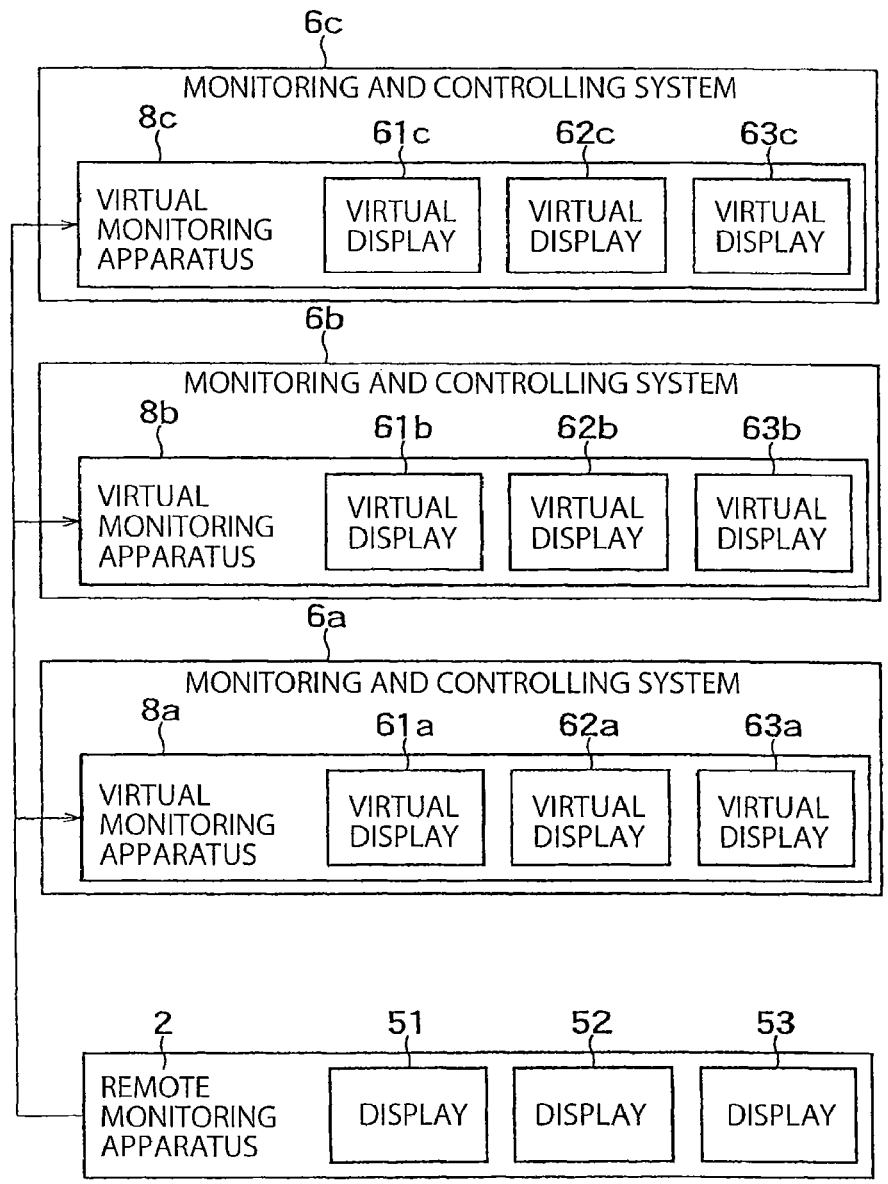
FIG. 9 is a schematic view showing a configuration of a remote monitoring system of a seventh embodiment.

FIG. 9 is a schematic view showing a configuration of a remote monitoring system of a seventh embodiment. In FIG. 9, illustration of the management server 1 is omitted.

The remote monitoring system of FIG. 9 includes the virtual monitoring apparatuses 8a to 8c respectively provided in the monitoring and controlling systems 6a to 6c. The virtual monitoring apparatuses 8a to 8c are realized respectively by VDI servers (not shown) in the monitoring and controlling systems 6a to 6c. Each of the virtual monitoring apparatuses 8a to 8c has functions similar to those of the monitoring apparatus 3 of FIG. 1 and includes the screen transfer module 31 of FIG. 1. Each of the virtual monitoring apparatuses 8a to 8c may be further provided with the HMI software storing module 32 of FIG. 5.

The monitoring and controlling systems 6a to 6c may monitor and control the same electric power plant or may monitor and control different electric power plants.

The virtual monitoring apparatus 8a includes virtual displays 61a, 62a, and 63a respectively displaying first, second, and third monitoring screens. The virtual monitoring apparatus 8b includes virtual displays 61b, 62b, and 63b respectively displaying first, second, and third monitoring screens. The virtual monitoring apparatus 8c includes virtual displays 61c, 62c, and 63c respectively displaying first, second, and third monitoring screens. The three virtual displays 61, 62, and 63 of each of the virtual monitoring apparatus 8 are examples of first to k-th virtual displays respectively displaying first to k-th (k is an integer of two or more) monitoring screens.

Each of the virtual displays 61, 62, and 63 is not required to be physically one display as well as the virtual monitoring apparatuses 8. For example, the three virtual displays 61, 62, and 63 of the single virtual monitoring apparatus 8 may be realized by a single display.

The remote monitoring apparatus 2 includes displays 51, 52, and 53, which respectively display first, second, and third monitoring screens transferred from the virtual monitoring apparatuses 8. The three displays 51, 52, and 53 of the remote monitoring apparatus 2 are examples of first to k-th displays, which respectively display first to k-th monitoring screens.

When the remote monitoring apparatus 2 accesses the virtual monitoring apparatus 8a, a first monitoring screen of the virtual display 61a is transferred to the display 51, a second monitoring screen of the virtual display 62a is transferred to the display 52, and a third monitoring screen of the virtual display 63a is transferred to the display 53. Similarly, when the remote monitoring apparatus 2 accesses the virtual monitoring apparatus 8b, first to third monitoring screens of the virtual displays 61b to 63b are transferred to the displays 51 to 53, respectively. Similarly, when the remote monitoring apparatus 2 accesses the virtual monitoring apparatus 8c, first to third monitoring screens of the virtual displays 61c to 63c are respectively transferred to the displays 51 to 53.

The first monitoring screen of the virtual monitoring apparatus 8a, the first monitoring screen of the virtual monitoring apparatus 8b, and the first monitoring screen of the virtual monitoring apparatus 8c may display similar monitoring targets. For example, the monitoring screens of the virtual monitoring apparatuses 8a to 8c may display the state of turbines monitored and controlled by the monitoring and controlling systems 6a to 6c. In this case, the user of the remote monitoring apparatus 2 can monitor and operate the state of turbines of a plurality of electric power plants by the single display 51. The same also applies to the second and third monitoring screens.

(Effects of Seventh Embodiment)

Generally, when a user is to monitor and operate an electric power plant by a certain terminal, a plurality of displays and a plurality of monitoring screens are often used by this terminal. In this case, generally, the user determines the monitoring screens to display by displays and monitor and operate the electric power plant while watching the plurality of monitoring screens.

According to the present embodiment, the plurality of monitoring screens of the monitoring apparatus 3 (virtual monitoring apparatuses 8) can be safely provided to the remote monitoring apparatus 2. According to the present embodiment, the user of the remote monitoring apparatus 2 can check, at one location, the plurality of monitoring screens for monitoring a plurality of electric power plant and, at one location, efficiently monitor and operate the plurality of electric power plant.

(Eighth Embodiment)

Figure 10:
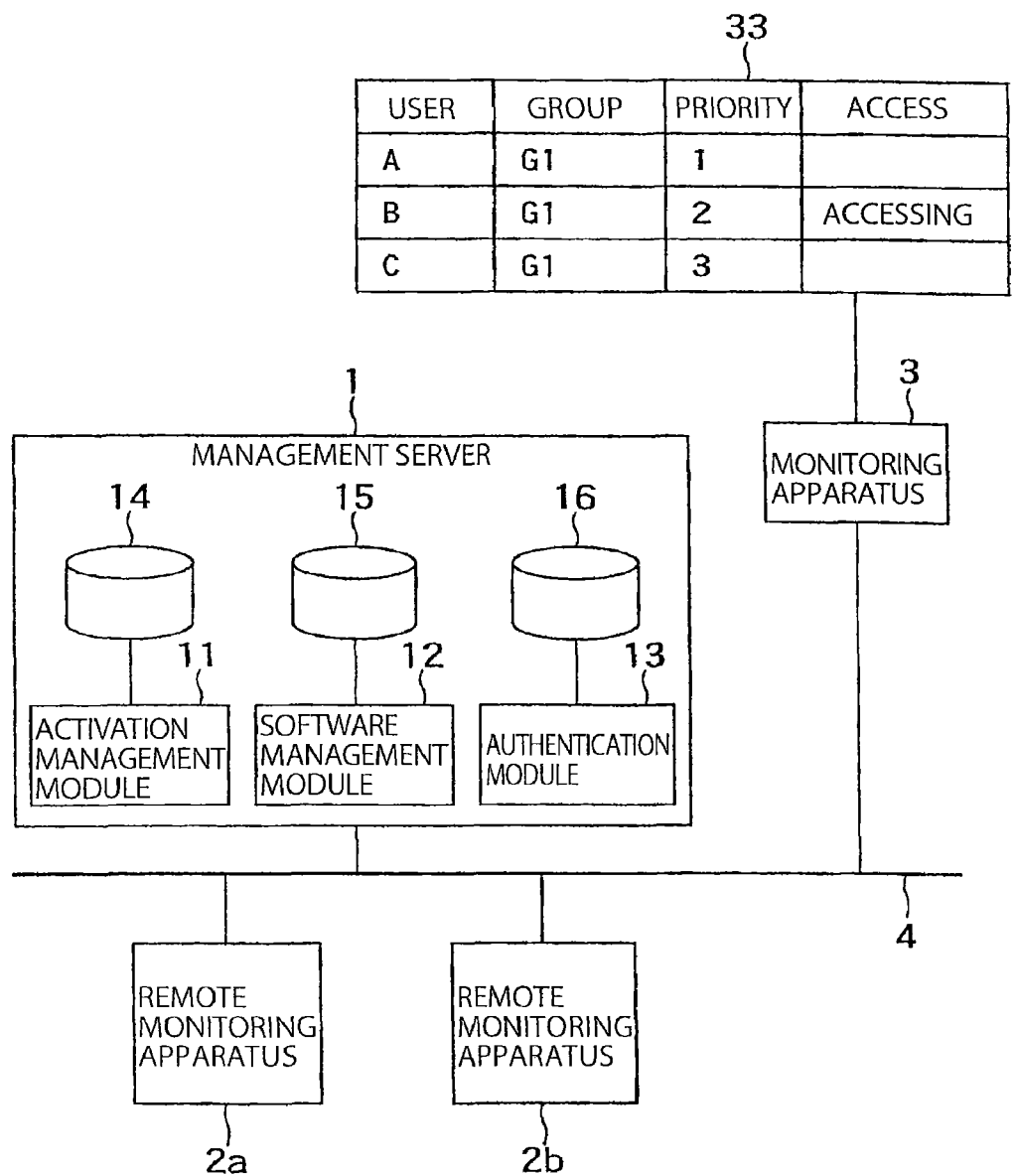
FIG. 10 is a schematic view showing a configuration of a remote monitoring system of an eighth embodiment.

FIG. 10 is a schematic view showing a configuration of a remote monitoring system of an eighth embodiment.

The monitoring apparatus 3 of FIG. 10 includes the user management table 33 as well as the monitoring apparatus 3 of FIG. 7. In the present embodiment, the priority of users can be defined in the user management table 33. The user management table 33 of the present embodiment can manage the information of the user(s) who is accessing the monitoring apparatus 3 at the present point of time. FIG. 10 shows that a user B is accessing the monitoring apparatus 3.

A case in which, while the user B is accessing the monitoring apparatus 3 by the remote monitoring apparatus 2b, a user A or a user C accesses the monitoring apparatus 3 by the remote monitoring apparatus 2a is assumed.

If only the user B is accessing the monitoring apparatus 3, the remote monitoring apparatus 2b can display the monitoring screen transferred from the monitoring apparatus 3, and the electric power plant can be operated by operations on the monitoring screen. Therefore, the user B can monitor and operate the electric power plant.

In this case, if the user A accesses the monitoring apparatus 3 by the remote monitoring apparatus 2a, the monitoring apparatus 3 permits the remote monitoring apparatus 2a to display the monitoring screen and operate the electric power plant. Therefore, the user A can monitor and operate the electric power plant. In this case, the remote monitoring apparatus 2b is continuously permitted to display the monitoring screen; however, permission of operations of the electric power plant is cancelled. Therefore, the user B can monitor the electric power plant, but cannot operate the electric power plant. The reason therefor is that the priority of the user A is higher than the priority of the user B. The priority of the users A and B is an example of first and second priority.

On the other hand, if the user C accesses the monitoring apparatus 3 by the remote monitoring apparatus 2a, the monitoring apparatus 3 permits the remote monitoring apparatus 2a to display the monitoring screen, but does not permit the remote monitoring apparatus 2a to operate the electric power plant. Therefore, the user C can monitor the electric power plant, but cannot operate the electric power plant. In this process, the remote monitoring apparatus 2b is continuously permitted to display the monitoring screen and operate the electric power plant. Therefore, the user B can continuously monitor and operate the electric power plant. The reason therefor is that the priority of the user C is lower than the priority of the user B. The priority of the users B and C is an example of first and second priority.

In the present embodiment, instead of controlling the access to the monitoring apparatus 3 based on the priority, the access may be controlled by former-one priority or the latter-one priority. If the former-one priority is employed in the above described example, the user B is permitted to display the monitoring screen and operate the electric power plant, and the users A and C are permitted to only display the monitoring screens. On the other hand, if the latter-one priority is employed in the above described example, the user B is permitted to only display the monitoring screen, and the users A and C are permitted to display the monitoring screens and operate the electric power plant.

(Effects of Eighth Embodiment)

According to the present embodiment, the same monitoring screens can be shared by the plurality of remote monitoring apparatuses 2a and 2b, and a plurality of users can share information. However, according to the present embodiment, since the authority to operate the electric power plant via the monitoring apparatus 3 is given only to the single remote monitoring apparatus 2, occurrence of inconsistency in the operations of the electric power plant can be avoided.

(Ninth Embodiment)

Figure 11:
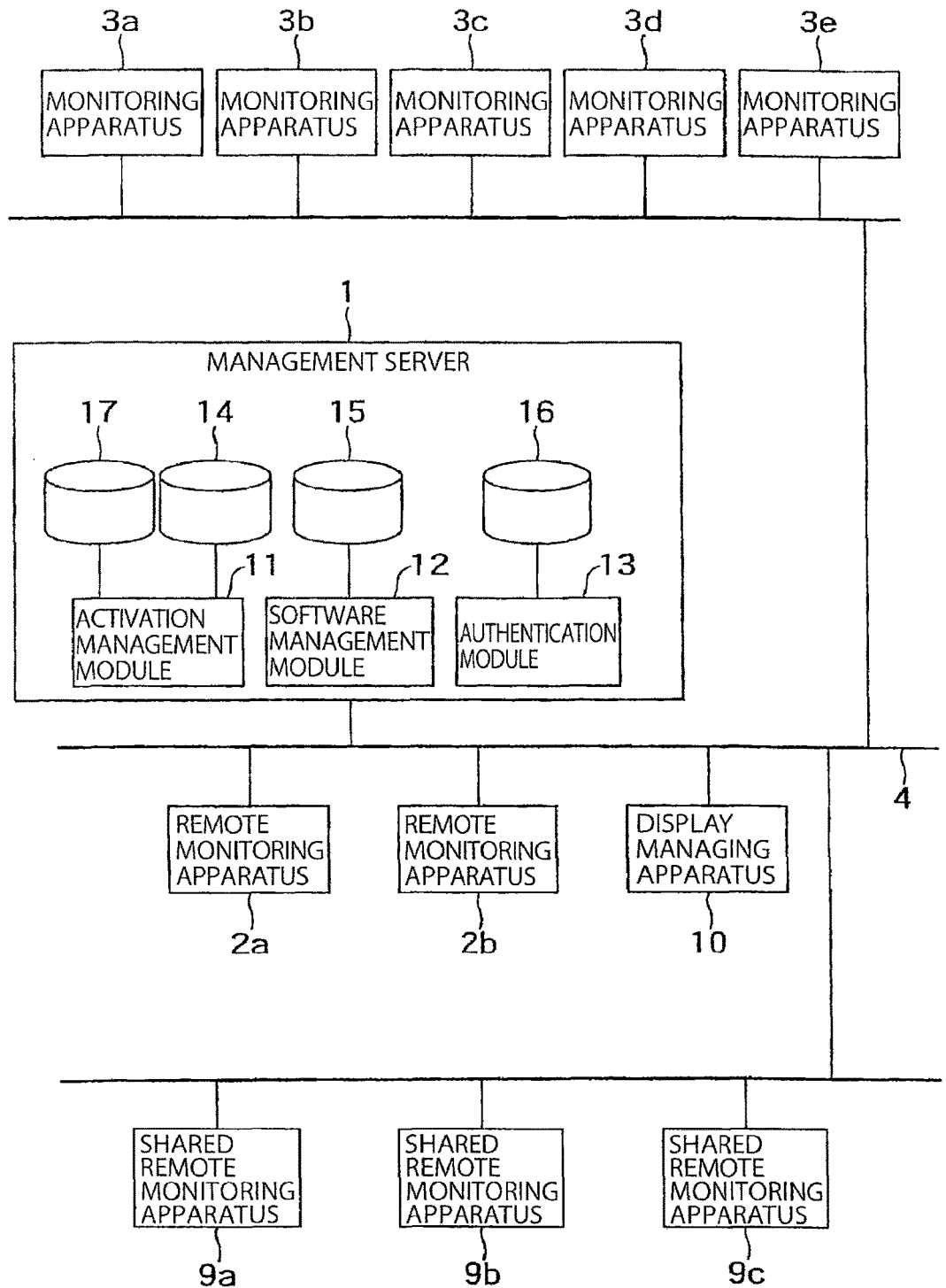
FIG. 11 is a schematic view showing a configuration of a remote monitoring system of a ninth embodiment.

FIG. 11 is a schematic view showing a configuration of a remote monitoring system of a ninth embodiment.

The remote monitoring system of FIG. 11 includes the management server 1, the remote monitoring apparatuses 2a and 2b, monitoring apparatuses 3a to 3e, the network 4, shared remote monitoring apparatuses 9a to 9c, and a display management apparatus 10. The remote monitoring apparatuses 2a and 2b and the shared remote monitoring apparatuses 9a to 9c are examples of first to m-th remote monitoring apparatuses. The monitoring apparatuses 3a to 3e are examples of first to n-th monitoring apparatuses.

The management server 1 includes a display management database 17, which is used by the activation management module 11. The shared remote monitoring apparatuses 9a to 9c have the functions similar to those of the remote monitoring apparatuses 2a and 2b. However, the remote monitoring apparatuses 2a and 2b are mainly used by a single user, and the shared remote monitoring apparatuses 9a to 9c are mainly used by a plurality of users.

FIG. 12 is a drawing showing an example of the display management database 17 in the remote monitoring system of the ninth embodiment.

The display management database 17 manages the information of the user(s) using the remote monitoring apparatuses 2a and 2b and the shared remote monitoring apparatuses 9a to 9c and the information of the monitoring apparatuses 3a to 3e displaying monitoring screens on the remote monitoring apparatuses 2a and 2b and the shared remote monitoring apparatuses 9a to 9c.

FIG. 12 shows that the remote monitoring apparatus 2a is used by a user A from 10:00 and is displaying the monitoring screen of the monitoring apparatus 3d. Furthermore, FIG. 12 shows that the remote monitoring apparatus 2b is used by a user B from 9:30 and is displaying the monitoring screen of the monitoring apparatus 3e. The items "order" and "trigger" of the display management database 17 will be explained later.

Hereinafter, the operation of the remote monitoring apparatuses 2a and 2b and the shared remote monitoring apparatuses 9a to 9c will be explained by taking the operation of the remote monitoring apparatus 2a as an example.

After the activation permission is obtained from the management server 1, the remote monitoring apparatus 2a downloads the connection software from the management server 1. The remote monitoring system of the present embodiment includes the plurality of monitoring apparatuses (3a to 3e). Therefore, the remote monitoring apparatus 2a selects the monitoring apparatus 3 to be connected and connects to the selected monitoring apparatus 3 by the connection software.

The remote monitoring apparatus 2a may be connected to the network 4 via the wireless network 5 (not shown). The remote monitoring apparatus 2a may perform heartbeat communication with the management server 1. In this case, the activation management module 11 of the management server 1 checks the display management database 17 before returning a heartbeat to the remote monitoring apparatus 2a. Then, the activation management module 11 causes the heartbeat to be returned to the remote monitoring apparatus 2a to include the information specifying the monitoring apparatus 3 which is to be connected by the remote monitoring apparatus 2a. In this case, the remote monitoring apparatus 2a switches connection to the monitoring apparatus 3 specified by the heartbeat.

(Effects of Ninth Embodiment)

The remote monitoring system of the present embodiment is assumed to be provided with the remote monitoring apparatuses 2a and 2b and the shared remote monitoring apparatuses 9a to 9c in a central operation room and be provided with the monitoring apparatuses 3a to 3e in a server room away from the central operation room. In the present embodiment it is assumed that the monitoring screens of the shared remote monitoring apparatuses 9a to 9c are displayed on large screens installed in the central operation room.

The users A and B access the monitoring apparatuses 3, which are desired to be watched by the users A and B, by the remote monitoring apparatuses 2a and 2b, respectively. This information is managed by the display management database 17.

In a case of normal operation of the electric power plant, an order column and a trigger column of the display management database 17 are blank space. If particular events occur during operation of the electric power plant, the order column of the display management database 17 is rewritten manually or automatically as shown in FIG. 12. For example, in the display management database 17 shown in FIG. 12, "monitoring apparatus 3a" is set in the order column for the remote monitoring apparatus 2a.

If the order column of the display management database 17 is rewritten like FIG. 12, the activation management module 11 checks the order column for the remote monitoring apparatus 2 when a heartbeat is received from the certain remote monitoring apparatus 2. Hereinafter, the remote monitoring apparatus 2 is assumed to be the remote monitoring apparatus 2a. Then, the activation management module 11 causes a heartbeat to be returned to the remote monitoring apparatus 2a to include order information that orders connection to the monitoring apparatus 3a set in the order column for the remote monitoring apparatus 2a. As a result, the remote monitoring apparatus 2a switches connection from the currently connected monitoring apparatus 3 to the monitoring apparatus 3a.

The activation management module 11 may transmit this order to the remote monitoring apparatus 2a with no relation to the heartbeat. More specifically, transmission of the information of the order column of the display management database 17 may be a pull type or a push type. In the present embodiment, whether the transmission of the information of the order column is to be the pull type or the push type can be set by the trigger column for each remote monitoring apparatus 2 (or each shared remote monitoring apparatus 9). In a case of the pull type, the information of the order column is transmitted together with the heartbeat. In a case of the push type, the information of the order column is transmitted with no relation to the heartbeat. The push type has an advantage that switching of the monitoring apparatus 3 can be performed in a shorter period of time.

In this manner, if the particular event occurs during operation of the electric power plant, the displays of the remote monitoring apparatuses 2a and 2b respectively display the monitoring screens from the monitoring apparatuses 3a and 3b. The displays of the shared remote monitoring apparatus 9a, 9b, and 9c respectively display the monitoring screens from the monitoring apparatus 3a, 3b, and 3c. Therefore, a large screen displays the monitoring screens from the monitoring apparatuses 3a, 3b, and 3c.

In the above manner, the display management database 17 of the present embodiment can include the orders regarding the combinations of the monitoring apparatuses 3 of transfer origins of the monitoring screens and the remote monitoring apparatuses 2 (or the shared remote monitoring apparatuses 9) of transfer destinations of the monitoring screens. Therefore, according to the present embodiment, for example in a case of event occurrence, the monitoring screens can be smoothly switched, and monitoring and operating of the electric power plant can be smoothly continued.

Rewriting of the display management database 17 may be automatically performed by using event occurrence as a trigger or may be manually performed by operating the monitoring screen by the users of the remote monitoring apparatuses 2 and the shared remote monitoring apparatuses 9. Rewriting of the display management database 17 may be performed from the display management apparatus 10. In this case, monitoring functions of the remote monitoring apparatuses 2 and the shared remote monitoring apparatuses 9 and rewriting functions of the display management apparatus 10 are separated. Therefore, for example, role allocation is enabled, for example, monitoring is performed by an operator, and rewriting is performed by a manager different from the operator.

(Tenth Embodiment)

FIG. 13 is a drawing showing an example of a display management database 17 in a remote monitoring system of a tenth embodiment. The configuration of the remote monitoring system of the tenth embodiment is similar to the configuration of the remote monitoring system of the ninth embodiment.

FIG. 13 shows that the remote monitoring apparatus 2a is being used from 10:00 by the user A and that the remote monitoring apparatus 2a is displaying the monitoring screen of the monitoring apparatus 3c. The order column and the trigger column of the present embodiment show that display is switched to the monitoring apparatus 3, which is set in the order column, at the timing set in the trigger column. Therefore, display of the remote monitoring apparatus 2a used by the user A is switched to the monitoring screen of the monitoring apparatus 3a at 10:30.

The monitoring screen of the ninth embodiment was switched in accordance of rewriting of the display management database 17. On the other hand, the monitoring screen of the present embodiment is switched at the timing set in the trigger column.

The order column of the display management database 17 of the present embodiment can include an order regarding stoppage of the power source of the remote monitoring apparatus 2. For example, the power source of the remote monitoring apparatus 2b used by the user B is stopped at 10:30 (see FIG. 13).

In the present embodiment, switching of the monitoring screen immediately after rewriting of the display management database 17 can be also set in the trigger column of the display management database 17. For example, the display of the shared remote monitoring apparatus 9a is switched to the monitoring screen of the monitoring apparatus 3b immediately after rewriting of the display management database 17 (see FIG. 13).

(Effects of Tenth Embodiment)

In the present embodiment, when "OFF" is set in the order column, usage of the remote monitoring apparatus 2 can be limited within a certain period. Therefore, according to the present embodiment, if the remote monitoring apparatus 2 is stolen, usage of the remote monitoring apparatus 2 can be prevented from being continued for a long period of time. According to the present embodiment, when an order of "OFF" of the remote monitoring apparatus 2 is the push type, the power source of the remote monitoring apparatus 2 can be immediately stopped in a case of theft or lost.

The display management database 17 of the present embodiment can also retain orders regarding the remote monitoring apparatus 2 and the shared remote monitoring apparatus 9, which are stopped. For example, the display management database 17 of FIG. 13 retains an order regarding the shared remote monitoring apparatus 9a, which is stopped. Therefore, according to the present embodiment, the monitoring apparatus 3 to which the remote monitoring apparatus 2 or the shared remote monitoring apparatus 9 connects immediately after activation can be set in advance.

For example, if the remote monitoring apparatus 2a is to be connected to the monitoring apparatus 3a and the power source of the remote monitoring apparatus 2a is then stopped, the information of the monitoring apparatus 3a may be set in the order column of the remote monitoring apparatus 2a. In this case, if the remote monitoring apparatus 2a is reactivated, the remote monitoring apparatus 2a is automatically reconnected to the monitoring apparatus 3a.

The remote monitoring system of the present embodiment is, for example, desired to be used as a monitoring system for a operation drill. For example, when drill end time is set in the trigger column, the setting of the remote monitoring system can be automatically returned from a drill mode to a normal mode after the drill is terminated. When the switching time from a certain level of a drill to another level is set in the trigger column, switching of the monitoring screen in accordance with the levels of the drill can be automatically smoothly performed.

While certain embodiments have been described, these embodiments have been presented by way of example only, and are not intended to limit the scope of the inventions. Indeed, the novel systems and apparatuses described herein may be embodied in a variety of other forms; furthermore, various omissions, substitutions and changes in the form of the systems and apparatuses described herein may be made without departing from the spirit of the inventions. The accompanying claims and their equivalents are intended to cover such forms or modifications as would fall within the scope and spirit of the inventions.

The invention claimed is:

1. A remote monitoring system comprising:
a monitoring apparatus configured to display a monitoring screen for monitoring an electric power plant;
a remote monitoring apparatus configured to display the monitoring screen transferred from the monitoring apparatus; and
a management server configured to manage information regarding the remote monitoring apparatus,
the management server being configured to
acquire apparatus identification information for identifying the remote monitoring apparatus,
return activation permission to the remote monitoring apparatus if the apparatus identification information matches apparatus identification information that is registered in advance,
return activation non-permission to the remote monitoring apparatus if the apparatus identification information does not match the apparatus identification information that is registered in advance,
store the activation permission or the activation non-permission to be associated with the apparatus identification information,
acquire user identification information for identifying a user of the remote monitoring apparatus, and
provide connection software to the remote monitoring apparatus if the user identification information matches user identification information that is registered in advance;
the remote monitoring apparatus comprising:
a secret information storing region configured to store the apparatus identification information, and to limit software accessible to the secret information storing region to basic input/output system (BIOS) software of the remote monitoring apparatus;
and being
configured to acquire the activation permission or the activation non-permission from the management server by providing the apparatus identification information in the secret information storing region to the management server, to continue activation of the remote monitoring apparatus depending on the activation permission, and to stop a power source of the remote monitoring apparatus depending on the activation non-permission,
configured to acquire the connection software from the management server by providing the user identification information to the management server; and
the monitoring apparatus
being configured to transfer the monitoring screen to the remote monitoring apparatus if the remote monitoring apparatus accesses the monitoring apparatus by the connection software.

2. The system of claim 1, wherein the remote monitoring apparatus performs heartbeat communication by wireless communication with an apparatus that can communicate with the remote monitoring apparatus, and stops a power source of the remote monitoring apparatus based on a state of the heartbeat communication.

3. The system of claim 1, wherein if connection between the monitoring apparatus and the remote monitoring apparatus is disconnected and the monitoring apparatus and the remote monitoring apparatus are reconnected, the monitoring apparatus transfers the monitoring screen in a state before the disconnection to the remote monitoring apparatus.

4. The system of claim 1, wherein the system comprises, as the monitoring apparatus, first to n-th monitoring apparatuses respectively provided in first to n-th monitoring and controlling systems that monitor and control one or more electric power plants where n is an integer of two or more, each of the first to n-th monitoring apparatuses being configured to transfer the monitoring screen to the remote monitoring apparatus if the remote monitoring apparatus accesses the monitoring apparatus by the connection software.

5. The system of claim 1, wherein the system comprises, as the remote monitoring apparatus, first to m-th remote monitoring apparatuses where m is an integer of two or more, the monitoring apparatus including a management table that manages priority when users of the first to m-th remote monitoring apparatuses access the monitoring apparatus.

6. The system of claim 1, wherein the system comprises, as the monitoring apparatus, a monitoring server including one or more virtual monitoring apparatuses, each virtual monitoring apparatus being configured to transfer the monitoring screen to the remote monitoring apparatus if the remote monitoring apparatus accesses the monitoring apparatus by the connection software.

7. The system of claim 6, wherein each virtual monitoring apparatus includes first to k-th virtual displays respectively displaying first to k-th monitoring screens where k is an integer of two or more, the remote monitoring apparatus including first to k-th displays respectively displaying the first to k-th monitoring screens transferred from each virtual monitoring apparatus.

8. The system of claim 5, wherein while one of a remote monitoring apparatus of a user having first priority and a remote monitoring apparatus of a user having second priority lower than the first priority is accessing the monitoring apparatus, if the other one accesses the monitoring apparatus, the monitoring apparatus permits the remote monitoring apparatus of the user having the first priority to display the monitoring screen and to operate the electric power plant, and the monitoring apparatus permits the remote monitoring apparatus of the user having the second priority to display the monitoring screen and does not permit the user having the second priority to operate the electric power plant.

9. The system of claim 1, wherein the system comprises, as the monitoring apparatus, first to n-th monitoring apparatuses where n is an integer of two or more, and includes, as the remote monitoring apparatus, first to m-th remote monitoring apparatuses where m is an integer of two or more, the management server including a display management database that includes an instruction regarding a combination of a monitoring apparatus serving as a transfer origin of the monitoring screen and a remote monitoring apparatus serving as a transfer destination of the monitoring screen.

10. The system of claim 1, wherein the management server includes a display management database that includes an instruction regarding stop of a power source of the remote monitoring apparatus.

\* \* \* \* \*